United States Patent Office 3,448,172
Patented June 3, 1969

3,448,172
FLEXIBILIZED POLYESTER RESIN COMPOSITIONS CONTAINING POLYURETHANES MODIFIED WITH VINYL MONOMERS AND PROCESS THEREFOR
Adolfas Damusis, Detroit, and Kurt C. Frisch, Grosse Ile, Mich., assignors to Wyandotte Chemicals Corporation, Wyandotte, Mich., a corporation of Michigan
No Drawing. Filed Dec. 8, 1966, Ser. No. 600,050
Int. Cl. C08g 41/00
U.S. Cl. 260—859     15 Claims

ABSTRACT OF THE DISCLOSURE

A flexibilized polyester resin composition is provided which consists of a mixture of an unsaturated polyester resin and a urethane polymer having an ordered arrangement of pendant unsaturation. The urethane polymer component provides flexibility and low shrinking properties to the cured composition. The product is useful in preparing hoses, footwear, and a wide variety of coated or molded articles.

---

This invention relates to a flexibilized polyester resin. In a more specific aspect, this invention relates to a polyester resin composition, flexibilized by means of a high molecular weight urethane polymer having an ordered arrangement of pendant unsaturation.

Heretofore, various unsaturated polyester resins have been prepared in solutions of vinyl monomers which may be cured, by a sulfur-curing or peroxide-curing procedure, to yield valuable elastomeric products. These products were, however, notably deficient in that they were quite brittle and possessed a high degree of shrinkage, such as from 7 to 10 linear percent. They also were unstable to the action of water, especially at elevated temperatures, so that their mechanical properties were substantially reduced.

It has been proposed in the prior art to correct these defects by reacting the unsaturated polyester, possessing free hydroxyl groups, with an aromatic or aliphatic diisocyanate such that free hydroxyl groups are still present, and the addition product obtained is then mixed with a vinyl or allyl compound and the copolymerizable solutions are then subjected to a polymerization process. While this technique of modifying the unsaturated polyester compound with an organic diisocyanate compound resulted in a product more stable to the action of water, it did not adequately correct the brittleness and high shrinkage problem.

It is, therefore, a specific object of this invention to prepare a polyester resin composition which is non-brittle and which does not shrink to any appreciable extent.

It is another object of this invention to prepare a polyester resin-polyurethane composition which has good flexural strength and impact resistance. Another object of this invention is to provide a compatible polyester resin-polyurethane composition which produces a clear product.

A further object of this invention is to provide a new polyester resin-polyurethane composition which may be prepared in a medium of reactive solvents, such as vinyl monomers, and which possesses a good pot life.

These and other objects of this invention are accomplished by providing a flexibilized polyester resin composition which comprises:

(A) From about 20% to 80% by weight of an unsaturated polyester resin, and
(B) From about 20% to 80% by weight of a urethane polymer having an ordered arrangement of pendant unsaturated —CH=CH$_2$ groups, a molecular weight in the range of about 1,200 to 30,000, an equivalent weight per one of said —CH=CH$_2$ groups in the range of about 400 to 5,000, and which is prepared by reacting—

(1) A material selected from the group consisting of
   (a) An isocyanate-terminated adduct having an average isocyanate functionality of about 1.3 to 2.0 and having an equivalent weight in the range of about 360 to 2,000, which is the reaction product of an isocyanate-terminated prepolymer having a functionality greater than two and a compound selected from the group consisting of unsaturated monohydroxy, monocarboxy, monoamino and monomercapto compounds containing a terminal —CH=CH$_2$ group, and
   (b) Hydroxy-terminated partially esterified adduct having an average hydroxyl functionality of about 1.3 to 2.0 and having an equivalent weight in the range of about 100 to 1,600, which is the reaction product of a polyether polyol having a functionality greater than two and an unsaturated monocarboxy acid containing a terminal —CH=CH$_2$ group with (2) A chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct.

The novel ingredient, which so unexpectedly and surprisingly contributes to the advantageous properties of the flexibilized polyester resin composition, is the urethane polymer. Not just any urethane polymer is capable of producing these results. It is only urethane polymer having an ordered arrangement of pendant unsaturation, disclosed above, which produces the desired results. The greatest disadvantage of the many prior art urethane polymers is that they are not satisfactorily compatible with the unsaturated polyester resin component of this invention. Thus, they produce products which are not clear, may be crumbly, and have poor physical properties. The novel urethane polymer component, disclosed above and more fully and completely described below, is the subject of U.S. patent application, Ser. No. 577,169, filed on Sept. 6, 1966, by Adolfas Damusis.

The isocyanate-terminated adduct utilized in the preparation of the urethane polymer of this invention contains at least one side group possessing a terminal —CH=CH$_2$ group and is prepared by reacting a monofunctional unsaturated compound with an isocyanate-terminated prepolymer having a functionality greater than two. The isocyanate-terminated prepolymer is prepared by procedures well known in the art, such as described in U.S. Patent No. 3,049,513. Thus, about one molar proportion of a polyol, such as a propylene oxide adduct of trimethylolpropane, is reacted under substantially anhydrous conditions with about one molar proportion of an organic diisocyanate for each hydroxyl group of the polyol to produce an isocyanate-terminated urethane prepolymer having a free NCO group at each terminus of the molecule. When the polyol is a triol, an abbreviated formula for the prepolymer can be represented as:

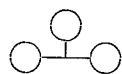

the circles representing the diisocyanate groups and the urethane linkages being omitted. Likewise, if the polyol is a tetrol, the prepolymer can be represented as:

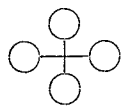

the circles representing the diisocyanate groups and the urethane linkages being omitted.

Any of a wide variety of organic diisocyanates may be employed to react with the polyols to prepare these polyurethane polymers, including aromatic, aliphatic and cyclolaiphatic diisocyanates and combinations of these types. It is to be understood that mixtures of two or more organic diisocyanates may be used. Representative compounds include toluene - 2,4 - diisocyanate, m-phenylene diisocyanate, 4-chloro-1,3-phenylene diisocyanate, 4,4-diphenylmethane diisocyanate, 1,5 - naphthylene diisocyanate, 1,4-tetramethylene diisocyanate, 1,6-hexamethylene diisocyanate, 1,10-decamethylene diisocyanate, 1,4-cyclohexylene diisocyanate 4,4'-methylene-bis(cyclohexylisocyanate) and 1,5-tetrahydronaphthylene diisocyanate. Arylene diisocyanates, i.e., those in which each of the two isocyanate groups is attached directly to an aromatic ring, are preferred. Compounds such as toluene-2,4-diisocyanate in which the two isocyanate groups differ in reactivity are particularly desirable.

The isocyanate-terminated adduct of this invention has an average isocyanate functionality of about 1.3 to 2.0 and is prepared by reacting for each mole of the isocyanate-terminated prepolymer an average of about ($n$–2) to ($n$–1.3) moles of a monofunctional unsaturated compound having a terminal —$CH=CH_2$ group, in which $n$ equals the number of terminal isocyanate groups contained in the prepolymer. Thus, a prepolymer prepared from a triol would have three terminal NCO groups and each mole of the prepolymer would be reacted with an average of about 1.0 to 1.7 moles (3–2.0 to 3–1.3 moles) of the monofunctional unsaturated compound. Likewise, a prepolymer prepared from a tetrol would have four terminal NCO groups and each mole of the prepolymer would be reacted with an average of about 2.0 to 2.7 moles (4–2.0 to 4–1.3 moles) of the monofunctional unsaturated compound.

The monofunctional unsaturated compounds useful in the practice of this invention are selected from the group consisting of monohydroxy, monocarboxy, monoamino and monomercapto compounds containing a terminal —$CH=CH_2$ group. These compounds may be represented by the formula: $CH_2=CH-R-X$, wherein R stands for an alkylene or arylene radical and wherein X may be an OH, COOH, $NH_2$ or SH group. Representative monohydroxy unsaturated compounds are allyl alcohol, glycerol diallyl ether, trimethylolpropane diallyl ether, monohydroxy ethyl-butene-2,3-alcohol, allyl vinyl carbinol, diallyl carbinol, diallyl oxypropanol, and the like. Representative monocarboxy unsaturated compounds are acrylic acid, methacrylic acid, oleic acid, ricinoleic acid, itaconic acid, and the like. It is to be understood that unsaturated esters which enter into transesterification reactions are also contemplated but not preferred in the practice of this invention. Representative monoamino unsaturated compounds are such as allyl amine, diallyl amine, and the like. Representative monomercapto compounds are such as 1-butene-4-thiol, 1-pentene-5-thiol, 1-hexene-6-thiol, and the like.

The reaction between the isocyanate-terminated prepolymer and one of the monofunctional unsaturated compounds listed above to produce an isocyanate-terminated adduct having an average isocyanate functionality of about 1.3 to 2.0 is carried out under conditions well known in the art for reacting an isocyanate-terminated compound with an organic reactive-hydrogen compound, i.e., in any suitable mixing equipment, at a temperature of about 60° C. to 120° C., under substantially anhydrous conditions, and with or without a catalyst. When the prepolymer is prepared from a tetrol, as illustrated above, an abbreviated formula for a difunctional isocyanate-terminated adduct may be represented as:

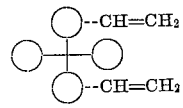

the circles representing the diisocyanate molecules and all the linkages being omitted. The equivalent weight of the prepolymer is selected such that the equivalent weight of the isocyanate-terminated adduct per NCO group is in the range of about 360 to 2,000. An equivalent weight of about 500 to 1,000 is preferred. This equivalent weight range is necessary in order that the terminal unsaturated —$CH=CH_2$ groups will be sufficiently pendant from the backbone of the urethane polymer. This structural arrangement results in a urethane polymer possessing enhanced elasticity and ease of cure.

The hydroxy-terminated partially esterified adduct utilized in the preparation of the urethane polymer of this invention has an average hydroxyl functionality of about 1.3 to 2.0 and contains at least one side group possessing a terminal —$CH=CH_2$ group. It is prepared by reacting a polyol which has a functionality greater than two, such as that used in the preparation of the isocyanate-terminated prepolymer above, with an unsaturated monocarboxy acid, such as that described above in the preparation of the difunctional isocyanate-terminated adduct. The conditions under which the reaction is carried out are those well known in the art and generally used in the preparation of ester linkages. Thus, the hydroxyl-containing compound and the carboxyl-containing compound may be charged into a reaction flask equipped with a stirring means, thermometer, nitrogen gas means, water trap, and heating mantle. The reaction is carried out at a temperature of about 120° C. to 200° C. and under a blanket of nitrogen. A catalyst, such as toluene sulfonic acid, and an antioxidant, such as hydroquinone, are generally employed. The polyol and unsaturated monocarboxy acid reactants are reacted in the same stoichiometric ratios described for the reactants used in preparing the isocyanate-terminated adduct above.

When the polyol is a polyether tetrol, as discussed above, and the unsaturated monocarboxy acid is acrylic acid, an abbreviated formula for a difunctional hydroxy-terminated partially esterified adduct may be represented as:

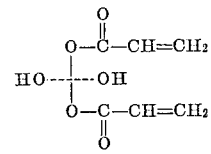

The equivalent weight of the polyol is selected such that the equivalent weight of the hydroxy-terminated adduct per OH group is in the range of about 100 to 1,600. An equivalent weight of about 200 to 800 is preferred. This equivalent weight range is necessary in order that the terminal unsaturated —$CH=CH_2$ groups will be sufficiently pendant from the backbone of the urethane polymer to impart enhanced elasticity and ease of cure.

The adducts prepared above are chain extended with a chain-extending agent, selected from the group consisting of difunctional hydroxy-, carboxy-, amino-, mercapto- and isocyanate-terminated polyether, polyester and polyurethane compounds, to produce the urethane polymers of this invention.

Representative difunctional hydroxy-terminated polyether, polyester and polyurethane compounds include polyoxyalkylene glycols, polyoxyalkylene aryl compounds, glycol and dicarboxylic acid condensation products in which not all of the alcohol groups are reacted, condensation products of glycols and ε-caprolactone, reaction products of an organic diisocyanate with an excess of a glycol or a hydroxyl-terminated polyether, reaction products of isocyanate-terminated polyurethane prepolymers with an excess of a hydroxy-terminated compound, and the like. The glycols disclosed in U.S. Patent No. 3,148,173 may also be used.

Representative difunctional carboxy-terminated polyether, polyester and polyurethane compounds include dicarboxylic acid and glycol condensation products in which not all the carboxyl groups are reacted with alcohol groups, reaction products of dicarboxylic acids with polyoxyalkylene glycols, reaction products of organic diisocyanates with excess acid polyesters, reaction products of isocyanate-terminated polyurethane prepolymers with excess carboxy-terminated compounds, and the like.

Representative difunctional amino-terminated polyether, polyester and polyurethane compounds include amine-terminated glycols and polyethers prepared by direct amination or cyanoethylation and hydrogenation of the corresponding glycols and polyethers, aliphatic diamines, aryl diamines, alkyl aryl diamines, reaction products of dicarboxylic acids with excess diamine compounds, reaction products of organic diisocyanates with excess aliphatic and aromatic diamines, reaction products of isocyanate-terminated polyurethane prepolymers with excess aliphatic and aromatic diamines, and the like.

Representative difunctional mercapto-terminated polyether, polyester and polyurethane compounds include aliphatic dithiols, aromatic dithiols, polyoxyalkylene dithiols, polyester dithiols, reaction products of organic diisocyanates and dithiols, and reaction products of isocyanate-terminated polyurethane prepolymers and dithiols. The polyalkyleneether-polythioether glycols, whose formula and method of preparation are described in U.S. Patent No. 3,148,173, may also be used.

Representative difunctional isocyanate-terminated polyether, polyester and polyurethane compounds include reaction products of polyoxyalkylene glycols with an excess of an organic diisocyanate, reaction products of hydroxy- and carboxy-terminated difunctional polyesters with an excess of an organic diisocyanate, and reaction products of difunctional polyurethane compounds terminated with reactive hydrogen-containing groups, as determined by the Zerewitinoff reaction, and in excess of an organic diisocyanate. The isocyanate-terminated prepolymers and starting materials described and prepared according to U.S. Patent No. 3,148,173 may also be used as chain-extending agents or components thereof in the practice of this invention.

When the adduct is isocyanate-terminated, the chain-extending agent may be hydroxy-, carboxy-, amino- or mercapto terminated. When the adduct is hydroxy-terminated, the chain-extending agent is isocyanate-terminated. The chain-extending agents mentioned above are all well-known compounds and are readily available to those skilled in the art. The chain-extending agents utilized are those having an equivalent weight in the range from about 200 to 4,000. Those having an equivalent weight of about 500 to 2,500 are preferred. The equivalent weight of the chain-extending agent is carefully controlled in order that in the chain-extension reaction the pendant unsaturated groups may be spaced in an ordered arrangement along the backbone of the urethane polymer.

The conditions under which the difunctional chain-extending agents and the above adducts are reacted to prepare the urethane polymers of this invention are well known in the art. Thus melt, emulsion, solvent, and the like, polymerization techniques may be utilized. Solvent polymerization is preferred. Solvents which may be used are toluene, xylene, styrene, vinyl benzene, and the like. Solvents such as styrene and other vinyl monomers, in which the urethane polymer produced may be cured by copolymerization with peroxide catalysts, are preferred. The reaction is carried out by charging the chain-extending agent, adduct prepared above, and solvent to a reaction vessel equipped with stirring and heating means. The reaction is conducted at a temperature of about 70° C. to 90° C. and for a period of about two hours. A catalyst, such as tertiary amine, stannous octoate, and the like, is generally employed. The urethane polymer produced may be recovered from the solvent by vacuum distillation.

It is desired that the urethane polymer of this invention have a molecular weight in the range from about 1,200 to 30,000. A molecular weight of about 2,000 to 18,000 is preferred. The urethane polymer has an equivalent weight per one —CH=CH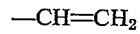₂ group of from about 400 to 5,000. If too many —CH=CH₂ groups are present, the stability of the polymer is impaired and the cured elastomeric product becomes too brittle. If there are not enough —CH=CH₂ groups present, curing of the urethane polymer is inhibited. Also, the cured product, prepared with a urethane polymer deficient in

—CH=CH₂ groups, will be too soft and tacky, thus presenting poor handling characteristics and physical properties. It should be apparent that the degree of unsaturation can be varied by adjusting the equivalent weight of either the reactants used in the preparation of the adducts or the chain-extending agent. Thus, the number of pendant groups containing terminal —CH=CH₂ groups can be readily computed from the equivalent weight of the adduct, the equivalent weight of the chain-extending agent, and the weight ratios of these reactants employed to produce the urethane polymers of this invention.

The urethane polymer having an ordered arrangement of pendant unsaturated —CH=CH₂ groups, as described above, is utilized in the present invention in an amount of from about 20% to 80% by weight of the total flexibilized polyester resin composition. It is preferred that the urethane polymer represent from about 40% to 60% by weight of the total composition. If the urethane polymer is present in an amount greater than about 80% by weight of the total composition, there is a notable lack of flexural strength. If less than about 20% by weight of the urethane polymer is utilized, there is no significant improvement in the obectionable brittleness and high shrinking properties characteristic of the prior art compounds.

The unsaturated polyester resins utilized in this invention are well-known in the art. They are obtained by the conventional thermal esterification of alpha, beta-unsaturated dicarboxylic acids or dicarboxylic acid anhydrides with polyhydric alcohols. An excess of the polyhydric alcohol component is generally used in order to obtain a polyester which has mainly hydroxyl end groups. The polyester compound produced may be linear or branched.

Any suitable polyhydric alcohol may be used, such as, for example, ethylene glycol, diethylene glycol and butanediol-1,3, and trihydric alcohols, such as trimethylol propane and glycerol, are among the most common polyhydric alcohols used in the preparation of the unsaturated polyesters. In addition, it is possible to use glycols which contain a tertiary amino group, such as, for example, p-dihydroxyethylaminodiphenyl or dihydroxyethyl aniline.

Any suitable unsaturated carboxylic acids or anhydrides may be used for the production of the unsaturated polyesters including maleic acid, fumaric acid, itaconic acid, oleic acid, ricinoleic acid, maleic anhydride and itaconic anhydride. It is also possible for acids which are not ethylenically unsaturated to be concurrently used, such as, for example, adipic acid, stearic acid, phthalic acid, tetrachlorophthalic acid or hexachloro endomethylene tetrahydrophthalic acid, as well as their anhydrides. Polyesters with a hydroxyl number higher than 100, preferably 150–300, and having acid number of about 2 to 30, have proved to be particularly suitable.

The thermal esterification procedure for preparing the unsaturated polyester component is well known in the art and is essentially a condensation reaction. The dicarboxylic acid or acid anhydride reactant, and the polyhydric alcohol reactant are placed in a suitable reaction vessel and heated, in an inert atmosphere, at a temperature of about 150° C. to 250° C. The heating is continued until the appropriate acid value, as determined by titration with standard potassium hydroxide base, is obtained. The product is then cooled and about 0.01% to 0.001% by weight of an antioxidant, such as hydroquinone, is added.

As stated above, the unsaturated polyester resin component of this invention comprises from about 20% to 80% by weight of the total flexibilized polyester resin composition. It is preferred that the polyester resin represent from about 40% to 60% by weight of the total composition. If the polyester resin is present in a greater amount than about 80% by weight, there is no significant improvement in the objectionable brittleness and high shrinking properties characteristic of the prior art compounds. If less than about 20% by weight of the polyester resin is present in the composition, there is a notable lack of flexural strength.

The flexibilized polyester resin composition is thus prepared by intimately blending from about 20% to 80% by weight of the unsaturated polyester resin component, described above, with from about 20% to 80% by weight of the urethane polymer component, described above. Prior to utilization, the novel composition of this invention is cured by either of two techniques. Thus, the composition may be cured by (1) a sulfur-curing procedure, or (2) by reaction with a copolymerizable vinyl monomeric compound.

When utilizing the sulfur-curing technique, the cure may be carried out according to conventional sulfur curing procedures. Thus, the blended polyester resin composition is milled to a smooth sheet on a rubber mill with sulfur and various other additives and compounding agents, such as catalysts, activating agents, vulcanization accelerators, copolymerizable compounds, fillers, pigments, refinishing substances, and the like. The milled stock is sheeted off the mill, placed in suitable molds, and the curing process completed by the application of heat and pressure. Various procedures and modifications of sulfur curing are more particularly described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

The polyester resin composition of this invention may also be cured by reaction with from about 10 to 100 weight percent of a copolymerizable vinyl monomeric compound at a temperature of about 30° C. to 120° C. The polyester resin composition is either dissolved in the copolymerizable vinyl compound or the vinyl compound may be used as a solvent for the individual components and the solutions may then be blended together. When a vinyl monomer is used in the urethane polymer preparation as described above, the latter procedure is preferred. It is advisable to add to these solutions, or blends of solutions, a polymerization retarding agent, such as, for example, hydroquinone, copper or cuprous salts, for stabilization purposes. The polymerization of these solutions takes place preferably in the presence of a polymerization catalyst, comprising an organic peroxide, such as, for example, benzoyl peroxide, cyclohexanone peroxide and cumene peroxide, and an accelerator comprising a heavy metal siccative, such as, for example, cobalt, lead and manganese compounds which are soluble in the reaction mixtures. Examples of suitable heavy metal siccatives include the naphthenates, octoates, oleates and halides of cobalt, lead and manganese or other metal salts which are usually used for the processing of drying oils.

Any suitable copolymerizable vinylidene compound may be utilized in the practice of the invention, representative examples including styrene, methacrylic esters, acrylic esters, vinyl toluene, divinyl benzene, diallyl phthalate and triallyl cyanurate. The copolymerizable vinylidene compound may constitute from about 10 to 100 weight percent, preferably about 40 to about 80 percent, of the mixture to be copolymerized.

The invention is further illustrated but not limited by the following examples in which parts and percentages given are by weight. As used herein, equivalent weight is the molecular weight of the compound per hydroxyl, NCO or —CH=CH$_2$ group, as specified. The molecular weights of the urethane polymers are calculated from the molecular weights and mole ratios of the reactants. The molecular weights of the polyols are calculated from their hydroxyl numbers according to the formula:

Molecular weight =
$$\frac{56.1 \times 1000 \times \text{number of hydroxyl groups}}{\text{hydroxyl number}}$$

The hydroxyl number is determined according to the "Phenyl Isocyanate Method for Hydroxyl Determination" as described by Reed, D. H., et al., Anal. Chem., 35, pp. 571–73, April 1963.

Unsaturation values for the hydroxy-terminated partially esterified adducts were determined by the hydrogenation method of Clausson, N. et al., as described on page 322, "Quantitative Organic Analysis Via Functional Groups"—S. Siggia, 3rd edition, John Wiley & Sons, New York, 1963.

ASTM Designation D–412 was used to evaluate stress-strain and tensile strength properties. The tensile testing machine was an Instron Model TPC–M–1. The hardness, Shore "D," of the cured composition was measured according to ASTM Designation D–676. Flexural strength and shrinkage were measured according to ASTM procedures D–790 and D–955 respectively. ASTM designation D–570 was used to measure water absorption.

EXAMPLE 1

(A) Preparation of isocyanate-terminated adduct.— 696 grams (4 moles) of tolylene diisocyanate were charged into a reaction flask equipped with a thermometer, stirring means, nitrogen gas means, and a heating mantle. 550 grams (1 mole) of a polyether tetrol (propylene oxide adduct of pentaerythritol, molecular weight 550) was added to the reaction flask under a blanket of nitrogen with stirring and maintaining the reaction temperature at about 80° C. The reaction was then continued by heating at about 80° C. for one hour. The isocyanate-terminated prepolymer so produced was diluted in the reaction flask to 80 weight percent solids by the addition of 376.5 grams of styrene, protected against oxidation by the addition of 1.6 grams of hydroquinone-antioxidant, and reacted with 260 grams (2 moles) of propylene glycol monomethacrylate, molecular weight 130, by heating at a temperature of about 80° C. for one hour. The isocyanate-terminated adduct produced had an NCO functionality of two, an equivalent weight per NCO group of 753, and contained two side chains terminated in —CH=CH$_2$ groups. The adduct was then diluted to 60 weight percent solids by the addition of 627.5 grams of styrene.

(B) Preparation of chain-extending agent.—1,816 grams (2 moles) of an isocyanate-terminated adduct of oxypropylated-bisphenol A (molecular weight 560) and tolylene diisocyanate; 948 grams (1 mole) of an isocyanate-terminated adduct of polypropylene glycol (molecular weight 600) and tolylene diisocyanate; and 472 grams (4 moles) of 1,6-hexane diol and 2157.3 grams of styrene were charged into a reaction flask equipped with a thermometer, stirring means, nitrogen gas means and heating mantle. The reaction was carried out under a blanket of nitrogen gas at a temperature of about 80°–90° C. for about two hours. The linear hydroxy-terminated polyurethane chain-extending agent produced had a molecular weight of 3,236, an equivalent weight per hydroxyl group of 1,618, and represented 60 weight percent solids in styrene.

(C) Preparation of urethane polymer.—7,530 grams (3 moles) of the isocyanate-terminated adduct in 60 weight percent styrene prepared in (A) above and 21,573 grams (4 moles) of the hydroxy-terminated polyurethane chain-extending agent in 60 weight percent styrene prepared in (B) above were placed in a reaction flask with 2.9 grams stannous octoate catalyst and reacted at about 80°–90° C. for two hours. The urethane polymer produced was hydroxy-terminated and had a molecular weight of 17,462, an equivalent weight per one hydroxyl group of 8,731 and an equivalent weight per one —CH=CH$_2$ group of 2,910.

(D) Preparation of flexibilized polyester resin composition and curing of the composition in vinyl monomer.—60 grams of an unsaturated polyester resin, having an acid number of 10, an OH number of 112, and which was prepared from 1 mole of phthalic acid, 0.5 moles of adipic acid, 1.5 moles of maleic acid and 3.1 moles of 1,3-butane diol by thermal condensation, were dissolved in 40 grams of styrene. This solution was intimately blended in a reaction vessel with a solution consisting of 60 grams of the urethane polymer prepared in (C) above, dissolved in 40 grams of styrene.

The mixture was cured by adding 0.15 grams of cobalt naphthenate, 1.5 grams of methyl ethyl ketone peroxide, and heating at a temperature of about 90° C. for 30 minutes. The properties of the cured flexibilized polyester resin composition were as follows:

| | |
|---|---|
| Tensile strength, p.s.i. | 3,620 |
| Flexural strength, p.s.i. | 2,240 |
| Shore "D" hardness: | |
|    Instantaneous | 66 |
|    5-second | 63 |
| Compatability | Clear |
| Water absorption: | |
|    4 hrs. at 100° C. | 0.58 |
|    24 hrs. at 23° C. | Nil |
| Shrinking, percent | <2 |

EXAMPLE 2

(A) Preparation of isocyanate-terminated adduct.—Hexamethylene diisocyanate in the amount of 672 grams (4 moles) was charged into a reaction flask equipped with a thermometer, stirring means, nitrogen gas means, and a heating mantle. 600 grams (1 mole) of a polyether tetrol (propylene oxide adduct of pentaerythritol, molecular weight 600) was added to the reaction flask under a blanket of nitrogen with stirring and maintaining the reaction temperature at about 80° C. The reaction was then continued by heating at about 80° C. for one hour. The isocyanate-terminated prepolymer produced was diluted in the reaction flask to 80 weight percent solids by the addition of 346.6 grams of vinyl toluene, protected against oxidation by the addition of 1.6 grams of hydroquinone-antioxidant, and reacted with 114.4 grams (2.66 moles) of allyl amine, molecular weight 43, by heating at a temperature of about 80° C. for one hour. The isocyanate-terminated adduct produced had an NCO functionality of 1.33, an equivalent weight per NCO group of 1.042, and contained an average of 2.66 side chains terminated in —CH=CH$_2$ groups. The adduct was then diluted to 60 weight percent solids by the addition of 577.7 grams of vinyl toluene.

(B) Preparation of chain-extending agent.—2,244 grams (3 moles) of a hydroxy-terminated polyester, prepared from 1 mole of phthalic anhydride, 1 mole of 1,4-butane glycol and 1.5 moles of propylene glycol; 348 grams (2 moles) of tolylene diisocyanate; and 1,728 grams of styrene were charged into a reaction flask equipped with a thermometer, stirring means, nitrogen gas means and a heating mantle. The reaction was carried out under a blanket of nitrogen gas at a temperature of about 80°–90° C. for about two hours. The linear hydroxy-terminated polyurethane chain-extending agent produced had a molecular weight of 2,592, an equivalent weight per hydroxyl group of 1,296, and represented 60 weight percent solids in styrene solvent.

(C) Preparation of urethane polymer.—6,932 grams (3 moles) of the isocyanate-terminated adduct in 60 weight percent vinyl toluene prepared in (A) above and 8,640 grams (2 moles) of the hydroxy-terminated polyurethane chain-extending agent in 60 weight percent styrene prepared in (B) above were placed in a reaction flask with 1.6 grams lead naphthenate catalyst and reacted at about 80°–90° C. for two hours. The urethane polymer so produced possessed terminal chains and side chains terminated with —CH=CR$_2$ groups and had a molecular weight of 9,343 and an equivalent weight per one —CH=CH$_2$ group of 1,168.

(D) Preparation of flexibilized polyester resin composition and curing of the composition in vinyl monomer.—60 grams of an unsaturated polyester resin, having an acid number of 10, an OH number of 112, and which was prepared from 1 mole of phthalic acid, 0.5 mole of adipic acid, 1.5 moles of maleic acid and 3.1 moles of 1,3-butane diol by thermal condensation, were dissolved in 40 grams of styrene. This solution was intimately blended in a reaction vessel with a solution consisting of 60 grams of the urethane polymer prepared in (C) above, dissolved in 40 grams of styrene.

The mixture was cured by adding 0.15 gram of cobalt naphthenate, 1.5 grams of methyl ethyl ketone peroxide, and heating at a temperature of about 90° for 30 minutes. The properties of the cured flexibilized polyester resin composition were as follows:

| | |
|---|---|
| Tensile strength, p.s.i. | 6,100 |
| Flexural strength, p.s.i. | 4,200 |
| Shore "D" hardness: | |
|    Instantaneous | 68 |
|    5-second | 64 |
| Compatibility | Clear |
| Water absorption: | |
|    4 hrs. at 100° C. | 0.58 |
|    24 hrs. at 23° C. | Nil |
| Shrinking, percent | <2 |

EXAMPLE 3

(A) Preparation of hydroxy-terminated partially esterified adduct.—400 grams (1 mole) of a polyether tetrol (propylene oxide adduct of pentaerythritol, molecular weight 400) were charged into a reaction flask equipped with a thermometer, stirring means, nitrogen gas means, water trap, and a heating mantle. The temperature of the reaction flask was raised to about 130°–135° C. and 7.9 grams toluene sulfonic acid catalyst, 0.6 gram hydroquinone-antioxidant and 144 grams (2 moles) of acrylic acid were added to the flask under a blanket of nitrogen with stirring. The temperature was maintained at about 130°–135° C. for about two hours until 2 moles of water, 36 grams, were recovered in the water trap.

The adduct so prepared was washed with saturated sodium chloride solution, neutralized with sodium bicarbonate, decolorized, filtered, and dried overnight in a vacuum at 105° C. The hydroxy-terminated, partially esterified adduct produced had a hydroxyl functionality of two and an equivalent weight per hydroxyl group of 254. The adduct possessed two side chains terminated in

—CH=CH$_2$ groups and had the following properties:

|  | Theoretical | Found |
|---|---|---|
| Unsaturation, moles/gram | 3.96 | 3.74 |
| Equivalents of unsaturation/mole | 2.00 | 1.88 |
| Hydroxyl number | 222.0 | 221.5 |
| Hydroxyl equivalents/mole | 2.00 | 1.99 |

(B) Preparation of chain-extending agent.—1,696 grams (2 moles) of an isocyanate-terminated adduct of oxypropylated-bisphenol A (molecular weight 500) and tolylene diisocyanate; 1,896 grams (2 moles) of an isocyanate-terminated adduct of polypropylene glycol (molecular weight 600) and tolylene-diisocyanate; 354 grams (3 moles) of 1,6-hexane diol and 2,630 grams of styrene were charged into a reaction flask equipped with a thermometer, stirring means, nitrogen gas means and a heating mantle. The reaction was carried out under a blanket of nitrogen gas at a temperature of about 80°–90° C. for about two hours.

The linear isocyanate-terminated polyurethane chain-extending agent produced had a molecular weight of 3,946, an equivalent weight per isocyanate group of 1,973, and represented 60 weight percent solids in styrene.

(C) Preparation of urethane polymer.—2,032 grams (4 moles) of the hydroxy-terminated partially esterified adduct prepared in (A) above, 19,728 grams (3 moles) of the isocyanate-terminated polyurethane chain-extending agent in 60 weight percent styrene prepared in (B) above, 3,456 grams vinyl toluene and 2.5 grams stannous octoate catalyst were placed in a reaction flask and reacted at about 80°–90° C. for two hours. The urethane polymer so produced was hydroxy-terminated and had a molecular weight of 13,869, an equivalent weight per one hydroxyl group of 6,935, and an equivalent weight per one —CH=CH$_2$ group of 1,734.

(D) Preparation of flexibilized polyester resin composition and curing of the composition in vinyl monomer.—60 grams of an unsaturated polyester resin, having an acid number of 10, an OH number of 112, and which was prepared from 1 mole of phthalic acid, 0.5 mole of adipic acid, 1.5 moles of maleic acid and 3.1 moles of 1,3-butane diol by thermal condensation, were dissolved in 40 grams of styrene. This solution was intimately blended in a reaction vessel with a solution consisting of 60 grams of the urethane polymer prepared in (C) above, dissolved in 40 grams of styrene.

The mixture was cured by adding 0.15 gram of cobalt naphthenate, 1.5 grams of methyl ethyl ketone peroxide, and heating at a temperature of about 90° C. for 30 minutes. The properties of the cured flexibilized polyester resin composition were as follows:

Tensile strength, p.s.i. _____ 5,920
Flexural strength, p.s.i. _____ 5,420
Shore "D" hardness:
    Instantaneous _____ 64
    5-second _____ 62
Compatibility _____ Clear
Water absorption:
    4 hrs. at 100° C. _____ 0.58
    24 hrs. at 23° C. _____ Nil
Shrinking, percent _____ <2

EXAMPLES 4–9

A series of cured flexibilized polyester resin compositions of this invention is prepared using various percentages of the polyurethane polymer component and unsaturated polyester resin component prepared in Example 3 above. In each example, the polyurethane polymer component and the unsaturated polyester resin component are dissolved in a 50% by weight styrene solution, intimately blended, and stabilized with 0.01% by weight of hydroquinone. The cure is effected by adding 0.15% by weight cobalt naphthenate, 1.5% by weight methyl ethyl ketone peroxide, and heating at a temperature of about 90° C. for 30 minutes. The following properties are obtained:

| | Composition | | | | Shore D hardness | | Water absorption | | | |
|---|---|---|---|---|---|---|---|---|---|---|
| Example No. | Polyurethane flexibilizer, percent | Polyester resin, percent | Tensile strength, p.s.i. | Flexural strength, p.s.i. | Instant | 5-sec. | 4 hrs. at 100° C. | 24 hr. at 23° C. | Compatibility | Shrinkage, percent |
| 4 | 100 | | 4320 | 1,200 | 62 | 58 | 0.24 | 0.20 | Clear | <2 |
| 5 | 80 | 20 | 4500 | 2,100 | 66 | 62 | 0.48 | Nil | do | <2 |
| 6 | 60 | 40 | 4700 | 3,950 | 71 | 69 | 0.58 | Nil | do | <2 |
| 7 | 40 | 60 | 6051 | 6,080 | 75 | 75 | 0.62 | Nil | do | <3 |
| 8 | 20 | 80 | 6300 | 7,800 | 78 | 77 | 1.0 | 0.28 | do | <5 |
| 9 | | 100 | 6720 | 12,441 | 81 | 80 | 1.20 | 0.20 | do | 10 |

EXAMPLE 10

(A) Preparation of urethane polymer modified with unsaturated hydroxy ester compound.—1,044 grams (6 moles) of tolylene diisocyanate are charged into a reaction flask equipped with a thermometer, stirring means, nitrogen gas means, and a heating mantle. 2,050 grams (5 moles) of a polyether diol (propylene oxide adduct of propylene glycol, molecular weight 410) are added to the reaction flask under a blanket of nitrogen gas with stirring and maintaining the reaction temperature at about 80° C. The reaction is then continued by heating at about 80° C. for one hour. The isocyanate-terminated prepolymer is diluted in the reaction flask to 80 weight percent solids by the addition of 773.5 grams of styrene, protected against oxidation by the addition of 3.6 grams of hydroquinone-antioxidant, and reacted with 344 grams (2 moles) of hexane diol monoacrylate, molecular weight 172, by heating at a temperature of about 80° C. for one hour. The linear urethane polymer produced has a molecular weight of 3,438 and is terminated with unsaturated —CH=CH$_2$ groups. The equivalent weight per one unsaturated —CH=CH$_2$ group is 1,719.

(B) Preparation of flexibilized polyester resin composition and curing of the composition in vinyl monomer.—60 grams of an unsaturated polyester resin, having an acid number of 10, an OH number of 112, and which is prepared from 1 mole of phthalic acid, 0.5 moles of adipic acid, 1.5 moles of maleic acid and 3.1 moles of 1,3-butane diol by thermal condensation, is dissolved in 40 grams of styrene. This solution is intimately blended in a reaction vessel with a solution consisting of 60 grams of the urethane polymer prepared in (A) above dissolved in 40 grams of styrene. The mixture is cured by adding 0.15 grams of cobalt naphthenate, 1.5 grams of methyl ethyl ketone peroxide, and heating at a temperature of about 90° C. for 30 minutes. The properties of the cured flexibilized polyester resin composition were not determined due to poor compatibility of the urethane polymer and polyester resin resulting in the cured product being cloudy, crumbly, and not suitable for testing.

The flexibilized polyester resin compositions prepared according to this invention have many uses. Examples 1–9 illustrate the excellent physical properties, stress-stain, tensile strength, flexibility, low shrinkage, and the like, of the cured flexibilized polyester resin compositions. The compositions are shown to have good pot life in vinyl monomers in which they may be conveniently cured to produce products of enhanced water resistance, flexibility, low shrinkage, and the like, properties. When employed in vinyl monomers, the polyester resin compositions present a 100% reactive, one-component, system.

Examples 4–9 above indicate the advantageous effects produced by utilizing different percentages of the urethane polymer in the composition of this invention. Thus, Example 4 indicates that when the urethane polymer is used without the polyester resin component, the product produced will be of low flexural strength and hardness. Example 9 shows that if the polyurethane component is lacking, the product will be brittle, subject to attack by water, and have a high degree of shrinkage. Examples 5–8 as well as Examples 1–3, indicate the excellent properties of the polyester resin compositions of this invention. Example 10 illustrates the lack of compatibility of the urethane polymers of the prior art in the polyester resin compositions of this invention.

The products of this invention may be utilized in the preparation of hoses, footwear, and a wide variety of coated or molded articles and elastomers. The cured flexibilized polyester resin compositions are characterized by excellent stability, flexibility, and low shrinking characteristics.

As many widely different embodiments of this invention may be made without departing from the spirit and scope thereof, it is understood that this invention is not limited, except as defined in the appended claims.

What is claimed is:

1. A flexibilized polyester resin composition which comprises:
  (A) from about 20% to 80% by weight of an unsaturated polyester resin selected from the group consisting of the reaction product of a dicarboxylic acid with a polyhydric alcohol and the reaction product of a dicarboxylic acid anhydride with a polyhydric alcohol, and
  (B) from about 20% by 80% by weight of urethane polymer having an ordered arrangement of pendant unsaturated —CH=CH$_2$ groups, a molecular weight in the range of about 1,200 to 30,000, an equivalent weight per one of said —CH=CH$_2$ groups in the range of about 400 to 5,000, and which is prepared by reacting:
    (1) a material selected from the group consisting of
      (a) an isocyanate-terminated adduct having an average isocyanate functionality of about 1.3 to 2.0 and having an equivalent weight in the range of about 360 to 2,000, which is the reaction product of an isocyanate-terminated prepolymer having a functionality greater than two and a compound selected from the group consisting of unsaturated monohydroxy, monocarboxy, monoamino and monomercapto compounds containing a terminal —CH=CH$_2$ group, and
      (b) hydroxy-terminated partially esterified adduct having an average hydroxyl functionality of about 1.3 to 2.0 and having an equivalent weight in the range of about 100 to 1,600, which is the reaction product of a polyether polyol having a functionality greater than two and an unsaturated monocarboxy acid containing a terminal

—CH=CH$_2$ group with
    (2) a chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct.

2. The flexibilized polyester resin composition of claim 1 wherein said composition comprises from about 40% to 60% by weight of said unsaturated polyester resin and from about 40% to 60% by weight of said urethane polymer.

3. The flexibilized polyester resin composition of claim 1 wherein said unsaturated polyester resin is the thermal condensation product of phthalic acid, adipic acid, maleic acid, and butane diol.

4. The flexibilized polyester resin composition of claim 1 wherein said material is an isocyanate-terminated adduct having an average isocyanate functionality of about 1.3 to 2.0 and having an equivalent weight in the range of about 500 to 1,000, and said chain-extending agent has an equivalent weight in the range of about 500 to 2,500.

5. The flexibilized polyester resin composition of claim 1 wherein said material is a hydroxy-terminated partially esterified adduct having an average hydroxyl functionality of about 1.3 to 2.0 and having an equivalent weight in the range of about 200 to 800 and said chain-extending agent has an equivalent weight in the range of about 500 to 2,500.

6. The flexibilized polyester resin composition of claim 4 wherein said isocyanate-terminated adduct is the reaction product of an isocyanate-terminated prepolymer having a functionality greater than two and a monocarboxy compound containing a terminal —CH=CH$_2$ group.

7. The flexibilized polyester resin composition of claim 4 wherein said isocyanate-terminated adduct is the reaction product of an isocyanate-terminated polymer having a functionality greater than two and a monocarboxy compound containing a terminal —CH=CH$_2$ group.

8. The flexibilized polyester resin composition of claim 4 wherein said isocyanate-terminated adduct is the reaction product of an isocyanate-terminated prepolymer having a functionality greater than two and a monoamino compound containing a terminal —CH=CH$_2$ group.

9. The flexibilized polyester resin composition of claim 4 wherein said chain-extending agent is a difunctional hydroxy-terminated polyurethane compound.

10. The flexibilized polyester resin composition of claim 5 wherein said hydroxy-terminated partially esterified adduct is the reaction product of a propylene oxide adduct of pentaerythritol and acrylic acid.

11. The flexibilized polyester resin composition of claim 5 wherein said chain-extending agent is a difunctional isocyanate-terminated polyurethane compound.

12. A process for making the flexibilized polyester resin composition of claim 1 which comprises dissolving:
  (A) from about 20% to 80% by weight of an unsaturated polyester resin selected from the group consisting of the reaction product of dicarboxylic acid with a polyhydric alcohol and the reaction product of dicarboxylic acid anhydride with a polyhydric alcohol in an unsaturated monomer solvent and thereafter blending, with
  (B) from about 20% to 80% by weight of a urethane polymer having an ordered arrangement of pendant unsaturated —CH=CH$_2$ groups a molecular weight in the range of about 1,200 to 30,000 an equivalent weight per one of said —CH=CH$_2$ groups in the range of about 400 to 5,000, and which is prepared by reacting:
    (1) a material selected from the group consisting of
      (a) an isocyanate-terminated adduct having an average isocyanate functionality of about 1.3 to 2.0 and having an equivalent weight in the range of about 360 to 2,000, which is the reaction product of an isocyanate-terminated prepolymer having a functionality greater than two and a compound selected from the group consisting of unsaturated monohydroxy, monocarboxy, monoamino and monomercapto compounds containing a terminal —CH=CH₂ group, and (b) hydroxy-terminated partially esterified adduct having an average hydroxyl functionality of about 1.3 to 2.0 and having an equivalent weight in the range of about 100 to 1,600, which is the reaction product of a polyether polyol having a functionality greater than two and an unsaturated monocarboxy acid containing a terminal

—CH=CH₂ group with (2) a chain-extending agent having an equivalent weight in the range of about 200 to 4,000 and which is selected from the group consisting of difunctional hydroxy-, carboxy-, amino- and mercapto-terminated polyether, polyester and polyurethane compounds when said material is an isocyanate-terminated adduct and which is selected from the group consisting of isocyanate-terminated polyether, polyester and polyurethane compounds when said material is a hydroxy-terminated partially esterified adduct, and (C) curing the mixture by adding from about 10 to 100 weight percent of a copolymerizable vinyl monomeric compound at a temperature of about 30 to 120° C.

13. The process according to claim 12 wherein said material is an isocyanate-terminated adduct having an average isocyanate functionality of about 1.3 to 2.0 and having an equivalent weight in the range of about 500 to 1,000, and said chain-extending agent has an equivalent weight in the range of about 500 to 2,500.

14. The process according to claim 12 wherein said material is a hydroxy-terminated partially esterified adduct having an average hydroxyl functionality of about 1.3 to 2.0 and having an equivalent weight in the range of about 200 to 800, and said chain-extending agent has an equivalent weight in the range of about 500 to 2,500.

15. A cured flexibilized polyester resin composition obtained by heating the composition of claim 1 at a temperature of about 30°–120° C. with from about 10 to 100 weight percent of a copolymerizable vinyl monomer in the presence of a peroxide catalyst.

References Cited

UNITED STATES PATENTS

| | | | |
|---|---|---|---|
| 2,879,250 | 3/1959 | Eisenmann et al. | 260—45.4 |
| 2,915,493 | 12/1959 | Nischk et al. | 260—45.4 |
| 3,047,530 | 7/1962 | Nischk et al. | 260—45.4 |
| 3,100,759 | 8/1963 | Boussu et al. | 260—77.5 |
| 3,386,962 | 6/1968 | Damusis | 260—77.5 |

FOREIGN PATENTS

| | | |
|---|---|---|
| 609,570 | 11/1960 | Canada. |
| 610,140 | 10/1948 | Great Britain. |
| 754,604 | 8/1956 | Great Britain. |

HOSEA E. TAYLOR, JR., *Primary Examiner.*

H. S. COCKERAM, *Assistant Examiner.*

U.S. Cl. X.R.

260—18, 75, 77.5

PO-1050
(5/69)

UNITED STATES PATENT OFFICE
CERTIFICATE OF CORRECTION

Patent No. 3,448,172          Dated June 3, 1969

Inventor(s) Adolfas Damusis and Kurt C. Frisch

It is certified that error appears in the above-identified patent and that said Letters Patent are hereby corrected as shown below:

IN THE CLAIMS:

Column 14, claim 6, line 26, delete "monocarboxy" and insert --monohydroxy--.

Column 14, claim 7, line 30, delete "polymer" and insert --prepolymer--.

SIGNED AND
SEALED

SEP 30 1969

(SEAL)
Attest:

Edward M. Fletcher, Jr.
Attesting Officer

WILLIAM E. SCHUYLER, JR.
Commissioner of Patents